(12) United States Patent
Sakanaka

(10) Patent No.: US 6,507,424 B2
(45) Date of Patent: Jan. 14, 2003

(54) OPTICAL SPACE COMMUNICATION APPARATUS

(75) Inventor: Tetsuo Sakanaka, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/176,333

(22) Filed: Oct. 22, 1998

(65) Prior Publication Data

US 2002/0080452 A1 Jun. 27, 2002

(30) Foreign Application Priority Data

Oct. 24, 1997 (JP) .............................. 9-309796

(51) Int. Cl.⁷ .............................................. H04B 10/00
(52) U.S. Cl. ...................................... 359/159; 359/193
(58) Field of Search ................................ 359/159, 172, 359/154, 156, 187, 189, 193

(56) References Cited

U.S. PATENT DOCUMENTS

| 4,761,777 A | * | 8/1988 | Edwards et al. | ............. 359/133 |
| 5,045,843 A | * | 9/1991 | Hansen | ....................... 345/158 |
| 5,065,455 A | * | 11/1991 | Ito et al. | ...................... 359/159 |
| 5,347,387 A | * | 9/1994 | Rice | ............................ 359/152 |
| 5,680,239 A | * | 10/1997 | Liva et al. | ................... 359/143 |
| 5,710,652 A | * | 1/1998 | Bloom et al. | ................ 359/152 |
| 5,867,294 A | * | 2/1999 | Sakai | .......................... 359/172 |
| 6,046,786 A | * | 4/2000 | Sharp et al. | ................. 349/119 |
| 6,181,451 B1 | * | 1/2001 | Ferguson et al. | ........... 359/127 |

* cited by examiner

Primary Examiner—Jason Chan
Assistant Examiner—Christina Y Leung
(74) Attorney, Agent, or Firm—Fitzpatrick, Cella, Harper & Scinto

(57) ABSTRACT

An optical space communication apparatus for performing communication with an party apparatus by transmitting a light signal into a free space includes a signal selector for selecting and intercepting a beam including a light beam and background light from the party apparatus, a detector for detecting a beam via the signal selector, and a signal outputting device for comparing an output signal outputted from the detector when the signal selector intercepts the light beam from the party apparatus, with an output signal outputted from the detector when the signal selector does not intercept the light beam from the party apparatus, and for outputting a signal representing a difference between the output signals.

10 Claims, 5 Drawing Sheets

OPTICAL SPACE COMMUNICATION APPARATUS

BACKGROUND OF THE INVENTION

1. Field of the Invention

The present invention relates to an optical space communication apparatus which performs communication between two points remote from each other by propagating a beam of a light signal modulated by a transmitted signal, in the atmosphere.

2. Related Background Art

In general, communication making use of the light signal permits transmission of large-capacity information at high speed and, particularly, optical space communication using the free space as a transmission line has advantages of higher portability and easier installation of communication channel than wire communications using optical fibers and the like. Conventional communication apparatuses employ automatic tracking (autotracking) for controlling the angle of emission of the light beam so as to prevent the light signal from dropping off the apparatus, in order to improve the reliability of optical space communication.

FIG. 1 is a diagram showing the structure of an optical space communication apparatus having a tracking function in a conventional example, in which a lens 1 for transmission and reception is placed at a position opposite a party apparatus and in which a lens 2 and a movable mirror 3 are located on the optical path behind the lens 1. A polarization beam splitter 4, a lens 5, and a light-emitting device 6 comprised of a semiconductor laser light source or the like are arranged in the direction of incidence of the movable mirror 3. A beam splitting mirror 7, a lens 8, and a position detector 9 are arranged in the direction of reflection of the polarization beam splitter 4, and a lens 10 and a light receiving element 11 are arranged in the direction of reflection of the beam splitting mirror 7.

The output terminal of a multiplexer 12 is connected to the light-emitting device 6, the output of a transmitted signal input terminal 13 is connected through an amplifier 14 to the multiplexer 12, and the output of an oscillator 15 is also connected to the multiplexer 12. Further, the output of the light receiving element 11 is connected through an amplifier 16 to a received signal output terminal 17.

The output of position detector 9 is connected to a tracking control circuit 18 and the output of the tracking control circuit 18 is connected to the movable mirror 3 through two actuators 19, 20 for varying the angle of the movable mirror 3. A collimation scope 21 for an inspector to verify collimation of axis by vision is provided nearly in parallel with the optical axis of the movable mirror 3.

On the occasion of transmission, the transmitted signal is input via the transmitted signal input terminal 13, amplified by the amplifier 14, and further multiplexed with a signal from the oscillator 15 in the multiplexer 12. Thereafter, the resultant signal is outputted to the light-emitting device 6. The light-emitting device 6 intensity-modulates its emitting light according to the input signal to convert it into a light signal. The beam from the light-emitting device 6 is guided through the lens 5 to the polarization beam splitter 4. Since this beam is polarized in parallel with the plane of the drawing, it is transmitted by the polarization beam splitter 4 as it is. Then the beam is reflected to the left by the movable mirror 3 and then passes through the lenses 2, 1 to be emitted toward the party apparatus.

On the occasion of reception, a light beam from the party apparatus is incident from the left into the lens 1, passes through the lens 2 to be reflected downward by the movable mirror 3, and then reaches the polarization beam splitter 4. Since this beam is polarized normally to the plane of the drawing, it is reflected to the right by the bond face of the polarization beam splitter 4 to be split into two directions by the beam splitting mirror 7. The beam reflected by the beam splitting mirror 7 passes through the lens 10 and then is received by the light receiving element 11 to be converted into an electric signal. Thereafter, the electric signal is amplified to an appropriate level by the amplifier 16 and the amplified signal is outputted from the received signal output terminal 17.

On the other hand, the beam transmitted through the beam splitting mirror 7 is converged by the lens 8 to be received as a spot image S by the position detector 9. The position detector 9 detects the position of the spot image S and outputs it as a position signal to the tracking control circuit 18. The tracking control circuit 18 computes an angle of the light beam from the party apparatus with respect to the optical path of the present apparatus, based on this position signal, and makes driving signals for the actuators 19, 20. The actuators 19, 20 adjust the angle of the movable mirror 3 so that the spot image S falls on the center of the position detector 9.

With this adjustment, the position of the light-emitting device 6 is also adjusted, whereby the optical path of the emitted beam comes to agree with that of the incident beam. Therefore, the light beam is accurately emitted toward the party apparatus. If the apparatus is inclined during communication to shift the optical path of the received light to deviate the position of the spot image S on the position detector 9 from the center, then the movable mirror 3 will be moved immediately to successively correct the optical path of incidence of the light beam so as to receive the spot image S at the center of the position detector 9, thereby preventing the incident light beam from dropping off the apparatus.

Here, the position detector 9 selectively detects only an ac pilot signal of a specific frequency in order to avoid influence of background light around the party apparatus, i.e., in order to prevent the position detection signal from being drawn to a strong background light so as to cause an error. This pilot signal is generated from the oscillator 15 and is multiplexed with the transmitted signal in the multiplexer 12 to be transmitted to the party apparatus.

FIG. 2 is a front elevation of a position detector 9 divided into four sections. The four segmental photodetecting elements 9a to 9d obtain the position of the spot image S by comparison of their outputs. FIG. 3 shows a two-dimensional light position detector 9e, in which a vertical position of the spot light S on this position detector 9e is detected by a difference between input voltages at the positive input terminal and at the negative input terminal of amplifier 22 and a horizontal position thereof by a difference between input voltages at the positive input terminal and at the negative input terminal of amplifier 23. In either case of FIG. 2 and FIG. 3, the background light, in addition to the spot light S, is also incident on the position detector 9a to 9e, and components of frequencies other than that of the pilot signal are removed by an electric circuit such as a filter or a frequency selective amplifier at the rear end of the position detector and are thus not detected.

The tracking function stated above does not work unless the light beam from the party apparatus arrives at a level that can be received and unless the spot image S impinges on a part of the position detector 9. In initial adjustment during installation of the apparatus, an operator fixes the movable mirror 3 at an initial position near the middle point and manually adjusts the direction of the apparatus while observing the party apparatus through the collimation scope 21.

The optical space communication apparatus of the conventional example described above, however, has the following problems, because it uses the pilot signal in order to avoid the influence of the background light.

(1) The apparatus has to incorporate an oscillator 15 and a multiplexer 12 of the pilot signal and the receiving section has to include a circuit for extracting only the pilot signal. Therefore, the cost is high.

(2) Since the pilot signal is superimposed on the transmitted signal, signal interference such as intermodulation, occurs because of nonlinearity of the light-emitting device 6, the light receiving element 11, the amplifier 16, and so on. This degrades the quality of the signal.

(3) In order to prevent the frequency band of the transmitted signal from overlapping with that of the pilot signal, the frequency band of the transmitted signal is limited. Further, since the position detector 9 normally has a small photoreceptive area, the initial adjustment needs to be conducted by observing the party apparatus through the collimation scope 21 in order to make the received light incident correctly. Since the positional relation needs to be adjusted with precision between the collimation scope 21 and the position detector 9, there is the cost necessary for installation and adjustment of the collimation scope 21.

SUMMARY OF THE INVENTION

An object of the present invention is to provide an optical space communication apparatus that eliminates the influence of background light without using a pilot signal, solving the above problems.

An optical space communication apparatus according to the present invention for accomplishing the above object is an optical space communication apparatus for performing communication with a party apparatus by transmitting a light signal into free space, where the optical space communication apparatus and the party apparatus are spaced apart at two positions opposite each other. The optical space communication apparatus comprises signal selecting means for selecting and intercepting a beam including a light beam and background light from the party apparatus, detecting means for detecting a beam via the signal selecting means, and signal outputting means for comparing an output signal output from the detecting means when the signal selecting means intercepts the light beam from the party apparatus, with an output signal output from the detecting means when the signal selecting means does not intercept a light beam from the party apparatus, and for outputting a signal representing a difference between the output signals.

DETAILED DESCRIPTION OF THE PREFERRED EMBODIMENTS

The present invention will be described in detail with reference to the embodiments illustrated in FIGS. 4 to 6.

Figure 4:
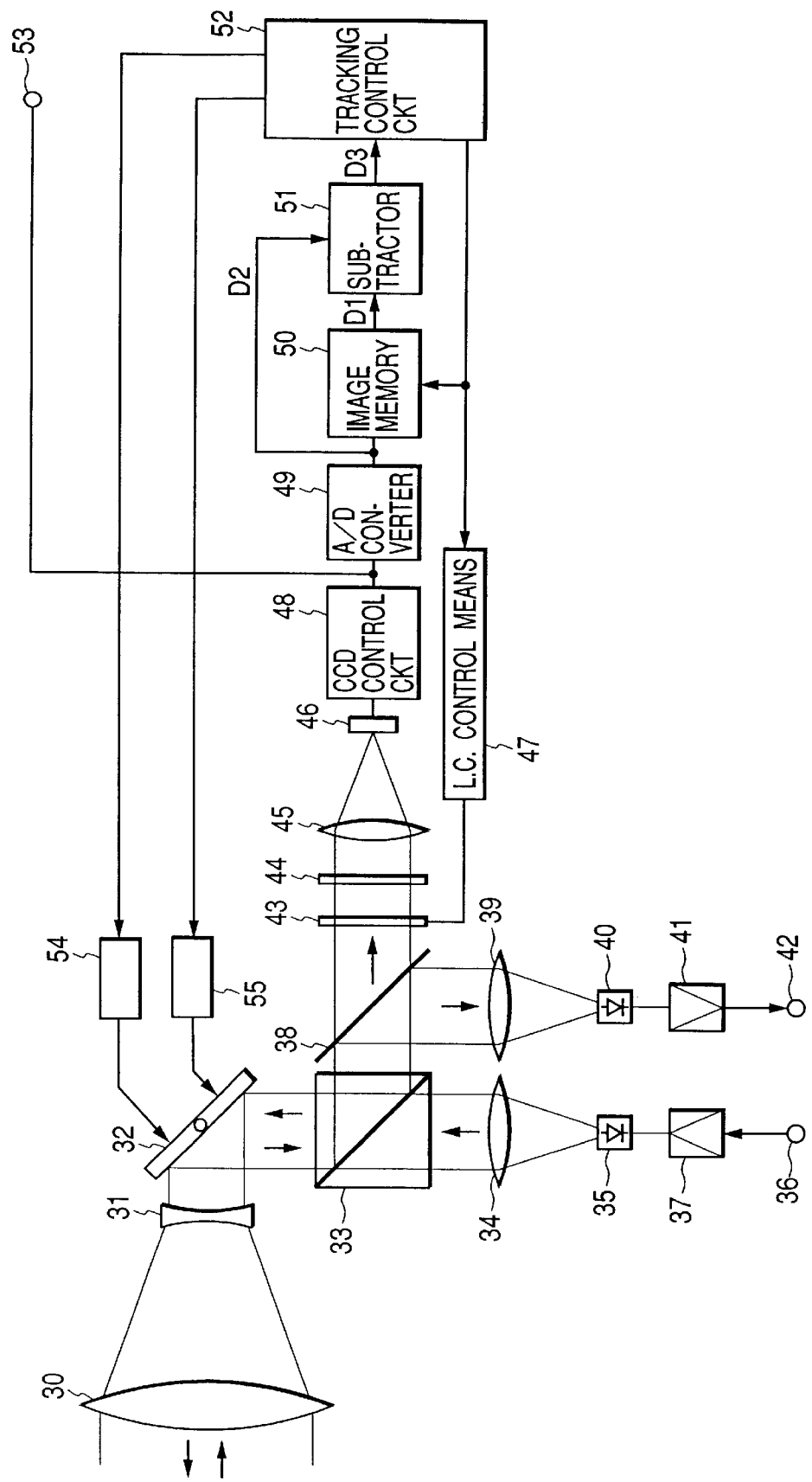
FIG. 4 is a diagram showing the structure of the first embodiment of the optical space communication apparatus according to the present invention.

FIG. 4 is a diagram showing the structure of the first embodiment of the optical space communication apparatus according to the present invention, in which a lens 30 for transmission and reception is located at a position opposite a party apparatus (not shown) and in which a lens 31 and a movable mirror 32 are placed on the optical path behind the lens 30. On the optical path in the direction of incidence of the movable mirror 32 there is a polarization beam splitter 33 which functions as a polarization beam splitter for a light beam in the infrared wavelength region, such as a signal light. The polarization beamsplitter 33 transmits the polarization component parallel to the plane of the drawing but reflects the polarization component normal to the plane of the drawing by its combination face. The optical path further includes a lens 34, and a light-emitting device 35, such as a semiconductor laser for emitting a light beam of infrared wavelength region. The output of a transmitted signal input terminal 36 is connected through an amplifier 37 to the light-emitting device 35.

A light splitting mirror 38 is placed in the direction of reflection of the polarization beam splitter 33. On the optical path in the direction of reflection of the beam splitting mirror 38 there are a lens 39 and a light receiving element 40, such as an avalanche photodiode or a pin diode, and the output of the light receiving element 40 is connected through an amplifier 41 to a received signal output terminal 42.

On the optical path in the direction of transmission of the beam splitting mirror 38 there are arranged, in order, a liquid crystal sheet 43, a polarizing plate 44 for transmitting polarized light normal to the plane of the drawing, a lens 45, and a CCD imaging device 46 serving as a position detector and as a finder for collimation. The output of the liquid crystal control unit 47 is connected to the liquid crystal sheet 43. The liquid crystal sheet 43 and the polarizing plate 44 may be positioned between the lens 45 and the CCD imaging device 46.

The output of the CCD imaging device 46 is successively coupled to a CCD control circuit 48, an A/D converter 49, an image memory 50, a subtracter 51, and a tracking control circuit 52. The output of the CCD control circuit 48 is also connected to a finder monitor terminal 53 and the output of the A/D converter 49 is also connected directly to the subtracter 51. The output of the tracking control circuit 52 is connected through two actuators 54, 55 to the movable mirror 32 and is also connected to the liquid crystal control unit, 47 and to the image memory 50.

On the occasion of transmission, the transmitted signal is input via the transmitted signal input terminal 36 and the transmitted signal is amplified by the amplifier 37 to be output to the light-emitting device 35. The transmitted signal is converted into a light signal in the light-emitting device 35, and the light signal is guided through the lens 34 to the polarization beam splitter 33. Since this beam is polarized in parallel to the plane of the drawing, the beam is transmitted by the polarization beam splitter 33 as it is, and it is then reflected to the left by the movable mirror 32 to be emitted through the lenses 31, 30 toward the party apparatus.

On the occasion of reception, a light beam from the party apparatus is incident into the lens 30 from the left, passes through the lens 31 to be reflected downward by the movable mirror 32, and then reaches the polarization beam splitter 33. Since this beam is polarized normally to the plane of the drawing, the beam is reflected to the right by the bond surface of the polarization beam splitter 33 and is then split into two directions by the beam splitting mirror 38. The beam reflected by the beam splitting mirror 38 is guided through the lens 39 and then is received by the light receiving element 40 to be converted into an electric signal. Thereafter, the electric signal is amplified to an appropriate level by the amplifier 41 and the amplified signal is output from the received signal output terminal 42.

Figure 5A:
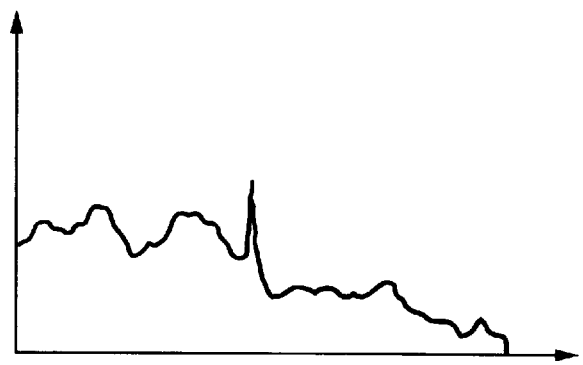
FIGS. 5A, 5B and 5C are graphs for explaining elimination of the influence of background

On the other hand, since the beam transmitted by the beam splitting mirror 38 is polarized normally to the plane of the drawing, in a state in which a voltage is not applied to the liquid crystal sheet 43 by a timing signal T from the tracking control circuit 52, the beam passes through the liquid crystal sheet 43 and polarizing plate 44 with little attenuation, then passes through the lens 45, and enters the CCD imaging device 46. The background light also passes on the same optical path to enter the CCD imaging device 46, but it is attenuated to half intensity during transmission through the polarizing plate 44, because the background light includes all the polarization components and the polarization beam splitter 33 functions as a typical beam splitter to the light beam of infrared wavelength region such as the background light. The received signal light and background light incident on the CCD imaging device 46 is converted into a video signal by the CCD control circuit 48 and the video signal is converted into a digital signal by the A/D converter 49. Video information of one field or one frame is written into the image memory 50. One line along the time axis near the central part of the image information thus written is, for example, as illustrated in FIG. 5A. The peak in the central part is the received signal light.

When voltage is applied to the liquid crystal sheet 43, the liquid crystal sheet 43 develops optical rotary power, so that the direction of polarization of the light transmitted thereby rotates 90°. As a result, most of the received signal light does not pass through the polarizing plate 44, whereas the background light is also attenuated to half intensity. Therefore, there is no change in the intensity of the background light between before and after the application of voltage to the liquid crystal sheet 43. Accordingly, only the background light is incident on the CCD imaging device 46 and the image signal is sent as a signal D2 via the CCD control circuit 48 and A/D converter 49 to the subtracter 51. On the other hand, the image signal written in the image memory 50 is read at the same timing so as to be sent as a signal D1 to the subtracter 51. The subtracter 51 executes subtraction between the signal D2 and the signal D1 using hardware, e.g., by means of a logic circuit, or using software, e.g., by means of the CPU, and outputs the result.

Figure 5B:
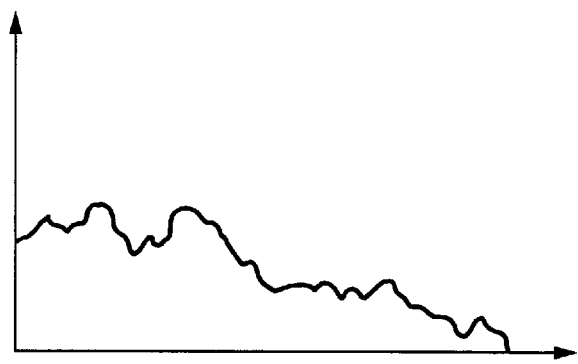
Figure 5C:
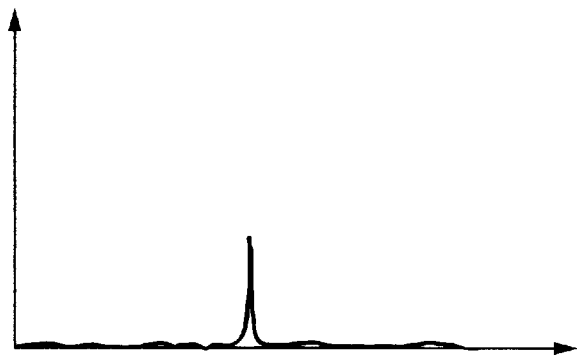

The signal of the line corresponding to FIG. 5A, in the signal D2 includes the background light and signal light, while a signal of a line corresponding to FIG. 5B, includes almost the same background light but no signal light. Since there is little difference between capture times of the signal of FIG. 5A and the signal of FIG. 5B, there is little change of the background light during the period between the capture times. The subtraction between them eliminates the components of the background light and extracts only the signal light to obtain the signal as illustrated in FIG. 5C. This signal is output as a signal D3 to the tracking control circuit 52. The tracking control circuit 52 checks the position of the peak of the signal D3 to detect the position of the signal light spot. Since the signal D3 is free of noise due to the components of the background light, the peak position can be detected readily and with accuracy. This method is also free of any error caused when the position detection result is drawn to a strong background light.

Control of timing for transmission/non-transmission of the signal light by the signal selecting means and timing of reading/writing from or in the image memory 50 is carried out by the timing signal T from the tracking control circuit 52. The tracking control circuit 52 generates driving signals for the actuators 54, 55, based on the position signal detected, thereby adjusting the angle of the movable mirror 32 in the same manner as in the conventional example.

The video signal from the CCD control circuit 48 is branched and output to the finder monitor terminal 53. A television monitor can be connected to the finder monitor terminal 53 to observe the picture picked up by the CCD imaging device 46. This obviates the need for the collimation scope and permits observation from a remote place by use of an extension cable.

Figure 1:
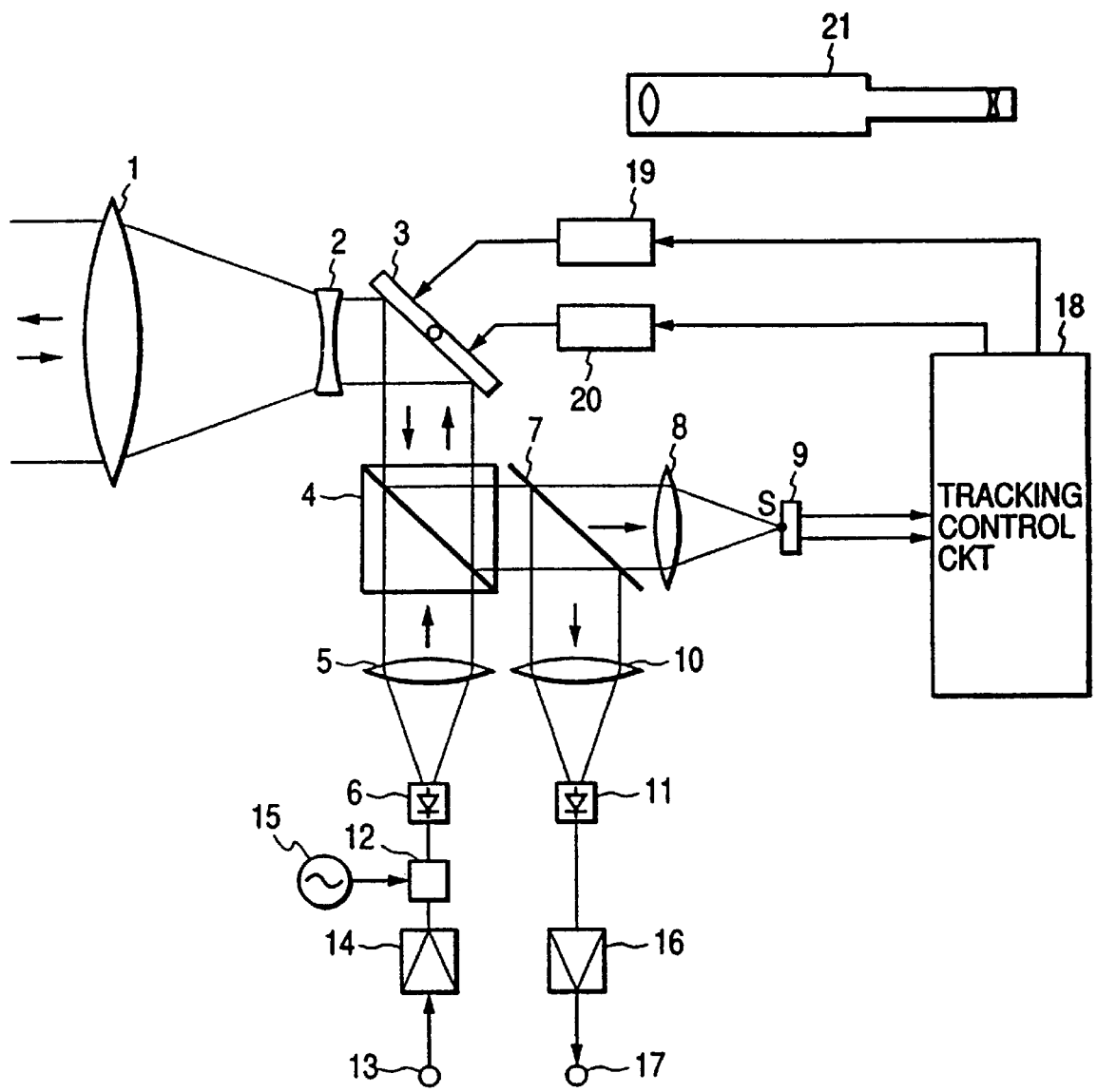
FIG. 1 is a diagram showing the structure of a conventional optical space communication apparatus.
Figure 2:
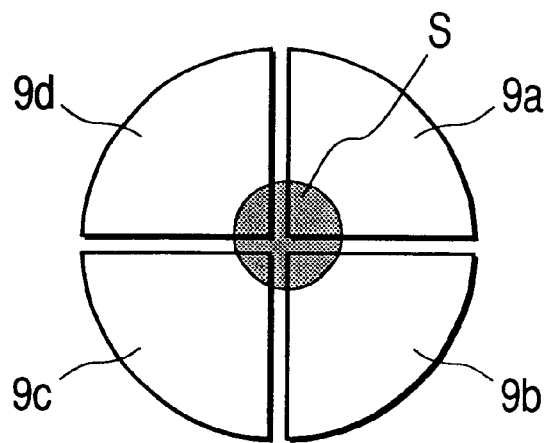
FIG. 2 is a front elevation of an example of the position detector.
Figure 3:
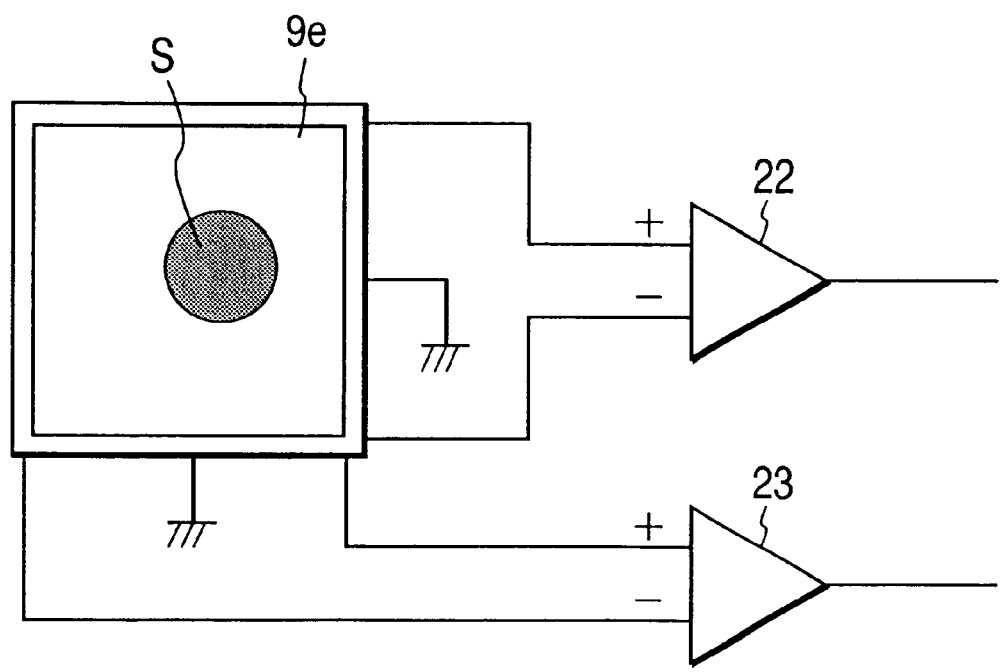
FIG. 3 is a diagram showing the structure of another conventional position detector.
Figure 6:
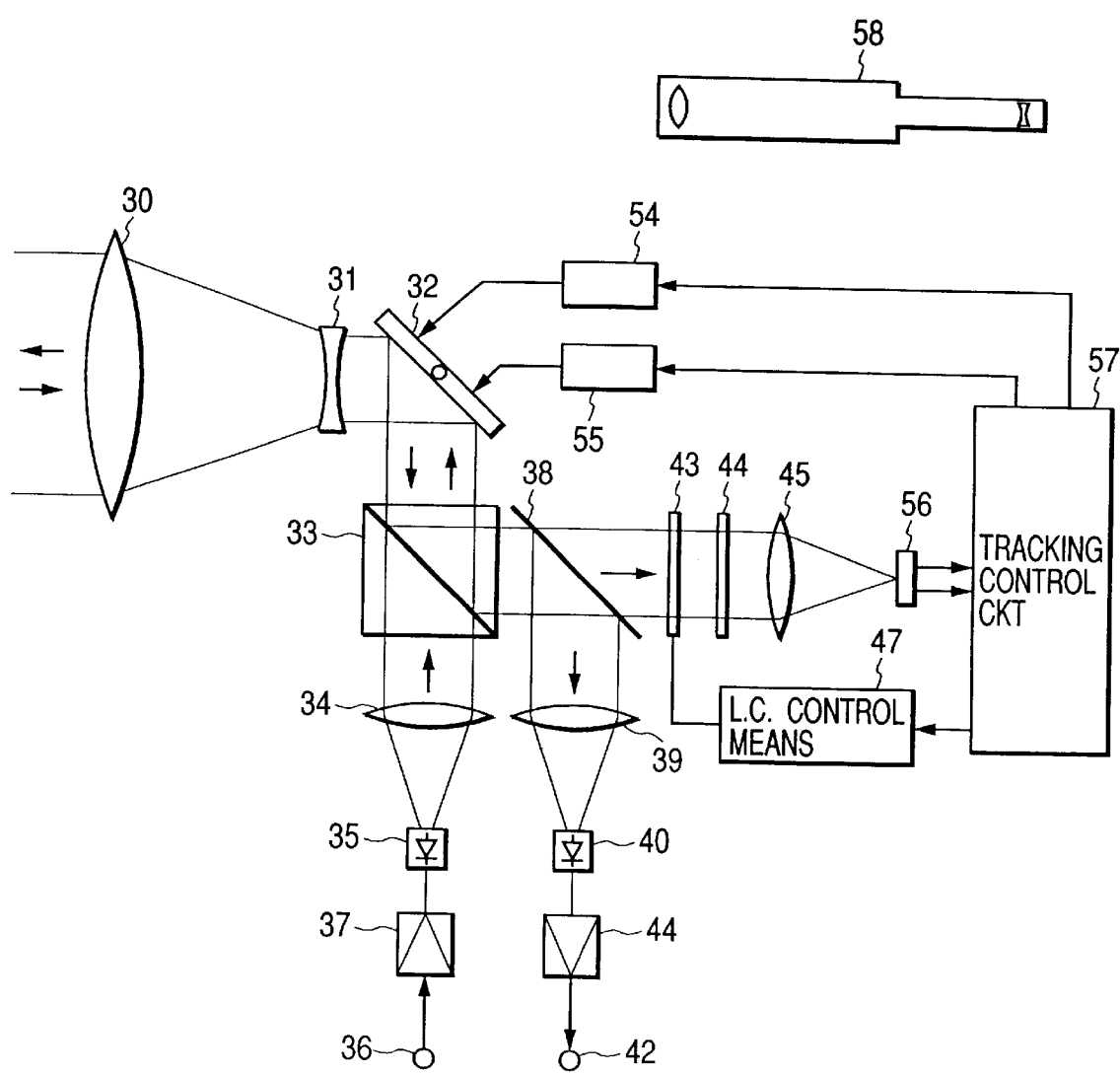
FIG. 6 is a diagram showing the structure of a second embodiment.

FIG. 6 is a diagram showing the structure of a second embodiment, in which a position detector 56, similar to the four segmental elements 9a to 9d of FIG. 2 or to the two-dimensional light position detector 9e of FIG. 3 in the conventional example, is used as the position detector 9. The output of the position detector 56 is connected to the tracking control circuit 57, similar to that in the conventional example, and the present embodiment does not use the CCD imaging device 46, CCD control circuit 48, A/D converter 49, image memory 50, subtracter 51, and tracking control circuit 52 of the first embodiment. The apparatus of the present embodiment is equipped with a collimation scope 58, similar to the conventional example, and the present embodiment does not use the pilot signal oscillator 15 and the multiplexer 12 of the conventional example. The other structure is similar to that of the first embodiment and the same members are denoted by the same symbols.

First, in the state in which voltage is not applied to the liquid crystal sheet 43, the received signal light and background light both pass through the liquid crystal sheet 43, the polarizing plate 44 and the lens 45 to enter the position detector 56. At this time, the position detector 56 outputs a position detection signal that represents a position corresponding to the center of gravity of intensity distribution of light which is superposition of the received signal light and the background light.

The tracking control circuit 57 temporarily stores this signal in the memory of the CPU. Since the amount of information to be stored is small, an extra memory like that in the first embodiment is not necessary. Next, voltage is applied to the liquid crystal sheet 43 to intercept the received signal light, so that only the background light is incident on the position detector 56. The output from the position detector 56 at this time represents the position of the center of gravity of intensity distribution of the background light. The tracking control circuit 57 subtracts the position signal resulting from only the background light, obtained this time, from the position signal resulting from the superposition of the received signal light and background light, stored previously, thereby obtaining a position signal of the component of only the received signal light with the background light components being canceled out. This permits accurate position detection of only the received signal light, independent of the state of the background light.

The present embodiment incorporates a collimation scope 58, and therefore does not use a pilot signal. Therefore, the present embodiment is free of any degradation of signal due to interference of the pilot signal and of any limitation of the frequency band of the signal.

In addition to the combination of the liquid crystal sheet 44 and the polarizing plate 45 in the first and second embodiments, the following method may be provided as signal selecting means for transmitting/intercepting only the received signal light at desired timing without affecting the intensity of the background light incident to the position detector 56.

(1) A half wave plate may be used instead of the liquid crystal sheet 43, where the half wave plate rotates the plane of polarization of emerging light by an angle equal to double the angle between the direction of polarization of incident light and the crystallographic axis. Therefore, switching between transmission and interception of the signal light can be effected by rotating the half wave plate 45° about the optical axis of the optical system (lens 45).

(2) Only the polarizing plate 44 may be used without using the liquid crystal sheet 43, where the polarizing plate 44 is arranged to be capable of rotating about the optical axis of the optical system (lens 45). The switching between transmission and interception of the signal light can be achieved by rotating the polarizing plate 90°.

(3) The signal light is normally light in the infrared wavelength region of semiconductor laser light or the like, whereas the background light is mostly light in the visible wavelength region. Accordingly, instead of the combination of the liquid crystal sheet 43 with the polarizing plate 44, a wavelength selective optical filter that transmits visible light but cuts infrared light may be interposed on the received light path, whereby the switching from transmission to interception can be achieved only of the signal light. As an example, the switching between transmission and interception of signal can be achieved by using a disk glass plate. a semicircular part of which is processed as a wavelength transmitting filter and by rotating the disk glass plate about the optical axis thereof.

The above embodiments illustrate an optical space communication apparatus having an autotracking function, but the present invention can also be applied to an angle detecting method of apparatus adapted to perform adjustment of angle by hand without the autotracking function. In this case, the adjustment work is carried out manually by adjusting the angle while observing an indication of a meter or a display of numbers or the like of the output from the position detector 46, 56, and so on, whereby accurate angle adjustment can be achieved without being affected by the background light, as in the case of autotracking.

As described above, the optical space communication apparatus according to the present invention can perform accurate angle detection at low cost without using a pilot signal for detection of angle and without being affected by the background light, and the apparatus can perform optical communication with high accuracy, because the transmitted/received signal is not affected by the pilot signal.

What is claimed is:

1. An optical space communication apparatus for use in a system for performing communication among a plurality of optical space communication apparatuses, said optical space communication apparatus comprising:

a first photodetector for detecting a light signal transmitted from another optical space communication apparatus having a light emitting device generating the light signal;

a second photodetector for detecting a spot position of an incoming light beam including the light signal and a background light;

an optical system having an optical path for guiding the incoming light beam;

light beam splitting means for splitting the incoming light beam into a first light beam directed to said first photodetector and a second light beam directed to said second photodetector;

switching means provided in the optical path of said optical system between said light beam splitting means and said second photodetector and adapted for switching between a first state, where only the background light in the second light beam is detected by said second photodetector and the light signal is intercepted, and a second state, where the light signal and the background light are both detected by said second photodetector;

a memory for storing an output of said second photodetector in either one of the first state and the second state;

a subtracter for executing subtraction between the output of said second photodetector stored in said memory and an output of said second photodetector in the other one of the first state and the second state, and outputting a subtraction signal resulting from the subtraction; and tracking means for tracking the light signal based on the subtraction signal output from said subtracter while the light emitting device of the other optical space communication apparatus is maintained in an on state.

2. The optical space communication apparatus according to claim 1, wherein said second photodetector comprises a CCD imaging device.

3. The optical space communication apparatus according to claim 1, wherein said second photodetector comprises a four-segmental light-receiving element.

4. The optical space communication apparatus according to claim 1, wherein said second photodetector comprises a two-dimensional light position detector.

5. The optical space communication apparatus according to claim 1, wherein said switching means comprises a liquid crystal element and a polarizing plate provided in the optical path of said optical system and a control circuit that controls the liquid crystal element.

6. The optical space communication apparatus according to claim 1, wherein said switching means comprises a half wave plate and a polarizing plate provided in the optical path of said optical system and means for rotating the half wave plate about a rotation axis along the optical axis of said optical system.

7. The optical space communication apparatus according to claim 1, wherein said switching means comprises a polarizing plate provided in the optical path of said optical system and means for rotating the polarizing plate about a rotation axis of said optical system.

8. The optical space communication apparatus according to claim 1, wherein said switching means comprises a wavelength selective optical filter and means for moving the optical filter between a position in the optical path of said optical system and a position outside the optical path.

9. The optical space communication apparatus according to claim 1, wherein said tracking means comprises a movable mirror provided in the optical path of said optical system and a tracking control circuit for controlling the movable mirror based on the subtraction signal.

10. A method of tracking a light signal during operation of an optical space communication apparatus used in a system for performing communication among a plurality of optical space communication apparatuses, the optical space communication apparatus comprising a first photodetector for detecting a light signal transmitted from another optical space communication apparatus having a light emitting device generating the light signal; a second photodetector for detecting a spot position of an incoming light beam including the light signal and background light; an optical system having an optical path for guiding the incoming light beam; light beam splitting means for splitting the incoming light beam into a first light beam directed to the first photodetector and a second light beam directed to the second photodetector; switching means provided in the optical path of the optical system between the light beam splitting means and the second photodetector and adapted for switching between a first state, where only the background light in the second light beam is detected by the second photodetector and the light signal is intercepted, and a second state, where the light signal and the background light are both detected by the second photodetector; a memory; and tracking means for tracking the light signal, said method comprising the steps of:

storing in the memory an output of the second photodetector in either one of the first state and the second state;

subtracting the output of the second photodetector stored in the memory in said storing step from an output of the second photodetector in the other one of the first state and the second state; and driving the tracking means in accordance with a result of the subtraction in said subtraction step while the light emitting device of the other optical space communication apparatus is maintained in an on state.

* * * * *

UNITED STATES PATENT AND TRADEMARK OFFICE
CERTIFICATE OF CORRECTION

PATENT NO. : 6,507,424 B2
DATED : January 14, 2003
INVENTOR(S) : Tetsuo Sakanaka It is certified that error appears in the above-identified patent and that said Letters Patent is hereby corrected as shown below:

<u>Column 4,</u>
Line 56, "unit," should read -- unit --.

<u>Column 7,</u>
Line 37, "plate." should read -- plate --.

Signed and Sealed this

Twenty-third Day of September, 2003

JAMES E. ROGAN
*Director of the United States Patent and Trademark Office*